US010605519B2

(12) United States Patent
Allo et al.

(10) Patent No.: US 10,605,519 B2
(45) Date of Patent: Mar. 31, 2020

(54) METHODS FOR DISPENSING AND COMPACTING INSULATION MATERIALS INTO A VACUUM SEALED STRUCTURE

(71) Applicant: WHIRLPOOL CORPORATION, Benton Harbor, MI (US)

(72) Inventors: Berhanu Allo, Newburgh, IN (US); Mohamed Alshourbagy, Stevensville, MI (US); Lakshya J. Deka, Mishawaka, IN (US); Abhay Naik, Stevensville, MI (US); Lorraine J. Westlake, Eau Claire, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/026,234

(22) Filed: Jul. 3, 2018

(65) Prior Publication Data

US 2018/0313599 A1    Nov. 1, 2018

Related U.S. Application Data

(63) Continuation of application No. 14/961,952, filed on Dec. 8, 2015, now Pat. No. 10,041,724.

(51) Int. Cl.
*F25D 23/00* (2006.01)
*B29B 11/00* (2006.01)
(Continued)

(52) U.S. Cl.
CPC ............ *F25D 23/062* (2013.01); *B29B 11/12* (2013.01); *B29C 43/00* (2013.01); *B29C 65/48* (2013.01);
(Continued)

(58) Field of Classification Search
CPC .......... F25D 23/00; F25D 23/06; F25D 23/06; F25D 23/062; F25D 23/068; B29B 11/00;
(Continued)

(56) References Cited

U.S. PATENT DOCUMENTS

| 1,849,369 A | 3/1932 | Frost |
| 1,921,576 A | 8/1933 | Muffly |

(Continued)

FOREIGN PATENT DOCUMENTS

| CA | 6526838 A | 5/1961 |
| CN | 201748744 U | 2/2011 |

(Continued)

OTHER PUBLICATIONS

Cai et al., "Generation of Metal Nanoparticles by Laser Ablation of Microspheres," J. Aerosol Sci., vol. 29, No. 5/6 (1998), pp. 627-636.
(Continued)

*Primary Examiner* — Jacob T Minskey
*Assistant Examiner* — Matthew Hoover
(74) *Attorney, Agent, or Firm* — Price Heneveld LLP

(57) ABSTRACT

A method of forming an insulated structure for an appliance includes forming a structural enclosure having an outer wrapper and an inner liner and an insulating cavity defined therebetween, forming an insulating powder material, compacting the insulating powder material to form a pre-densified core material, disposing the pre-densified core material within an insulating cavity, wherein the insulating cavity is defined between the outer wrapper and the inner liner and expressing at least a portion of the gas contained within the insulating cavity, wherein the insulating cavity is hermetically sealed to define a vacuum insulated structure.

17 Claims, 9 Drawing Sheets

(51) Int. Cl.
  *B29C 43/00* (2006.01)
  *B29C 65/00* (2006.01)
  *B29C 69/00* (2006.01)
  *F16L 59/00* (2006.01)
  *F25D 23/06* (2006.01)
  *F16L 59/065* (2006.01)
  *B29B 11/12* (2006.01)
  *B29C 65/48* (2006.01)
  *B29L 31/00* (2006.01)
  *B29C 43/14* (2006.01)
  *B29C 51/16* (2006.01)
  *B29K 105/00* (2006.01)

(52) U.S. Cl.
  CPC ............ *B29C 69/00* (2013.01); *F16L 59/065* (2013.01); *F25D 23/068* (2013.01); *B29C 43/006* (2013.01); *B29C 43/146* (2013.01); *B29C 51/162* (2013.01); *B29K 2105/251* (2013.01); *B29K 2995/0015* (2013.01); *B29L 2031/762* (2013.01); *B29L 2031/7622* (2013.01); *F25D 2201/14* (2013.01); *Y02B 40/34* (2013.01)

(58) Field of Classification Search
  CPC ......... B29B 11/10; B29B 11/12; B29C 43/00; B29C 65/00; B29C 65/40; B29C 65/48; B29C 69/00; F16L 59/00; F16L 59/06; F16L 59/06; F16L 59/065
  See application file for complete search history.

(56) References Cited

U.S. PATENT DOCUMENTS

| | | |
|---|---|---|
| 2,191,659 A | 2/1940 | Hintze |
| 2,432,042 A | 12/1947 | Richard |
| 2,451,884 A | 10/1948 | Stelzer |
| 2,729,863 A | 1/1956 | Kurtz |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,408,316 A | 10/1968 | Mueller et al. |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,670,521 A | 6/1972 | Dodge, III et al. |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,005,919 A | 2/1977 | Hoge et al. |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,330,310 A | 5/1982 | Tate, Jr. et al. |
| 4,396,362 A | 8/1983 | Thompson et al. |
| 4,529,368 A | 7/1985 | Makansi |
| 4,583,796 A | 4/1986 | Nakajima et al. |
| 4,681,788 A | 7/1987 | Barito et al. |
| 4,781,968 A | 11/1988 | Kellerman |
| 4,865,875 A | 9/1989 | Kellerman |
| 4,870,735 A | 10/1989 | Jahr et al. |
| 4,914,341 A | 4/1990 | Weaver et al. |
| 5,084,320 A | 1/1992 | Barito et al. |
| 5,094,899 A | 3/1992 | Rusek, Jr. |
| 5,121,593 A | 6/1992 | Forslund |
| 5,168,674 A | 12/1992 | Molthen |
| 5,171,346 A | 12/1992 | Hallett |
| 5,227,245 A | 7/1993 | Brands et al. |
| 5,251,455 A | 10/1993 | Cur et al. |
| 5,375,428 A | 12/1994 | LeClear et al. |
| 5,500,287 A | 3/1996 | Henderson |
| 5,500,305 A | 3/1996 | Bridges et al. |
| 5,505,810 A | 4/1996 | Kirby et al. |
| 5,509,248 A | 4/1996 | Dellby et al. |
| 5,532,034 A | 7/1996 | Kirby et al. |
| 5,533,311 A | 7/1996 | Tirrell et al. |
| 5,599,081 A | 2/1997 | Revlett et al. |
| 5,600,966 A | 2/1997 | Valence et al. |
| 5,768,837 A | 6/1998 | Sjoholm |
| 5,792,801 A | 8/1998 | Tsuda et al. |
| 5,826,780 A | 10/1998 | Neeser et al. |
| 5,834,126 A | 11/1998 | Sheu |
| 5,866,247 A | 2/1999 | Klatt et al. |
| 5,918,478 A | 7/1999 | Bostic et al. |
| 5,950,395 A | 9/1999 | Takemasa et al. |
| 5,952,404 A | 9/1999 | Simpson et al. |
| 6,013,700 A | 1/2000 | Asano et al. |
| 6,063,471 A | 5/2000 | Dietrich et al. |
| 6,163,976 A | 12/2000 | Tada et al. |
| 6,164,739 A | 12/2000 | Schultz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,244,458 B1 | 6/2001 | Frysinger et al. |
| 6,266,970 B1 | 7/2001 | Nam et al. |
| 6,294,595 B1 | 9/2001 | Tyagi et al. |
| 6,485,122 B2 | 1/2002 | Wolf et al. |
| 6,428,130 B1 | 8/2002 | Banicevic et al. |
| 6,430,780 B1 | 8/2002 | Kim et al. |
| 6,519,919 B1 | 2/2003 | Takenouchi et al. |
| 6,629,429 B1 | 10/2003 | Kawamura et al. |
| 6,655,766 B2 | 12/2003 | Hodges |
| 6,689,840 B1 | 2/2004 | Eustace et al. |
| 6,736,472 B2 | 5/2004 | Banicevic |
| 6,860,082 B1 | 3/2005 | Yamamoto et al. |
| 7,008,032 B2 | 3/2006 | Chekal et al. |
| 7,197,792 B2 | 4/2007 | Moon |
| 7,197,888 B2 | 4/2007 | LeClear et al. |
| 7,207,181 B2 | 4/2007 | Murray et al. |
| 7,234,247 B2 | 6/2007 | Maguire |
| 7,263,744 B2 | 9/2007 | Kim et al. |
| 7,360,371 B2 | 4/2008 | Feinauer et al. |
| 7,475,562 B2 | 1/2009 | Jackovin |
| 7,517,031 B2 | 4/2009 | Laible |
| 7,614,244 B2 | 11/2009 | Venkatakrishnan et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,794,805 B2 | 9/2010 | Aumaugher et al. |
| 7,845,745 B2 | 12/2010 | Gorz et al. |
| 7,938,148 B2 | 5/2011 | Carlier et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,108,972 B2 | 2/2012 | Bae et al. |
| 8,157,338 B2 | 4/2012 | Seo et al. |
| 8,162,415 B2 | 4/2012 | Hagele et al. |
| 8,182,051 B2 | 5/2012 | Laible et al. |
| 8,197,019 B2 | 6/2012 | Kim |
| 8,266,923 B2 | 9/2012 | Bauer et al. |
| 8,382,219 B2 | 2/2013 | Hottmann et al. |
| 8,434,317 B2 | 5/2013 | Besore |
| 8,439,460 B2 | 5/2013 | Laible et al. |
| 8,491,070 B2 | 7/2013 | Davis et al. |
| 8,516,845 B2 | 8/2013 | Wuesthoff et al. |
| 8,590,992 B2 | 11/2013 | Lim et al. |
| 8,717,029 B2 | 5/2014 | Chae et al. |
| 8,752,921 B2 | 6/2014 | Gorz et al. |
| 8,763,847 B2 | 7/2014 | Mortarotti |
| 8,764,133 B2 | 7/2014 | Park et al. |
| 8,776,390 B2 | 7/2014 | Hanaoka et al. |
| 8,840,204 B2 | 9/2014 | Bauer et al. |

(56) References Cited

U.S. PATENT DOCUMENTS

| | | |
|---|---|---|
| 8,881,398 B2 | 11/2014 | Hanley et al. |
| 8,905,503 B2 | 12/2014 | Sahasrabudhe et al. |
| 8,943,770 B2 | 2/2015 | Sanders et al. |
| 8,944,541 B2 | 2/2015 | Allard et al. |
| 9,009,969 B2 | 4/2015 | Choi et al. |
| RE45,501 E | 5/2015 | Maguire |
| 9,056,952 B2 | 6/2015 | Eilbracht et al. |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,140,481 B2 | 9/2015 | Curr et al. |
| 9,170,045 B2 | 10/2015 | Oh et al. |
| 9,170,046 B2 | 10/2015 | Jung et al. |
| 9,188,382 B2 | 11/2015 | Kim et al. |
| 8,955,352 B2 | 12/2015 | Lee et al. |
| 9,221,210 B2 | 12/2015 | Wu et al. |
| 9,228,386 B2 | 1/2016 | Thielmann et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0226141 A1 | 11/2004 | Yates et al. |
| 2005/0042247 A1 | 2/2005 | Gomoll et al. |
| 2005/0229614 A1 | 10/2005 | Ansted |
| 2006/0064846 A1 | 3/2006 | Espendola et al. |
| 2006/0261718 A1 | 11/2006 | Miseki et al. |
| 2006/0266075 A1 | 11/2006 | Itsuki et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2009/0032541 A1 | 2/2009 | Rogala et al. |
| 2009/0131571 A1 | 5/2009 | Fraser et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2010/0206464 A1 | 8/2010 | Kleo et al. |
| 2010/0218543 A1 | 9/2010 | Duchame |
| 2010/0287843 A1 | 11/2010 | Oh |
| 2010/0287974 A1 | 11/2010 | Cur et al. |
| 2011/0011119 A1 | 1/2011 | Kuehl et al. |
| 2011/0023527 A1 | 2/2011 | Kwon et al. |
| 2011/0052897 A1 | 3/2011 | Goto et al. |
| 2011/0095669 A1 | 4/2011 | Moon et al. |
| 2011/0215694 A1 | 9/2011 | Fink et al. |
| 2011/0220662 A1 | 9/2011 | Kim et al. |
| 2011/0309732 A1 | 12/2011 | Horil et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0240612 A1 | 9/2012 | Wuesthoff et al. |
| 2012/0280608 A1 | 11/2012 | Park et al. |
| 2013/0026900 A1 | 1/2013 | Oh et al. |
| 2013/0043780 A1 | 2/2013 | Ootsuka et al. |
| 2013/0221819 A1 | 8/2013 | Wing |
| 2013/0270732 A1 | 10/2013 | Wu et al. |
| 2013/0285527 A1 | 10/2013 | Choi et al. |
| 2013/0293080 A1 | 11/2013 | Kim et al. |
| 2013/0328472 A1 | 12/2013 | Shim et al. |
| 2014/0009055 A1 | 1/2014 | Cho et al. |
| 2014/0097733 A1 | 4/2014 | Seo et al. |
| 2014/0166926 A1 | 6/2014 | Lee et al. |
| 2014/0190978 A1 | 7/2014 | Bowman et al. |
| 2014/0196305 A1 | 7/2014 | Smith |
| 2014/0216706 A1 | 8/2014 | Melton et al. |
| 2014/0232250 A1 | 8/2014 | Kim et al. |
| 2014/0346942 A1 | 11/2014 | Kim et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0059399 A1 | 3/2015 | Hwang et al. |
| 2015/0115790 A1 | 4/2015 | Ogg |
| 2015/0159936 A1 | 6/2015 | Oh et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241115 A1 | 8/2015 | Strauss et al. |
| 2015/0241118 A1 | 8/2015 | Wu |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Niemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0176086 A1 | 6/2017 | Kang |
| 2017/0184339 A1 | 6/2017 | Liu et al. |
| 2017/0191746 A1 | 7/2017 | Seo |

FOREIGN PATENT DOCUMENTS

| | | |
|---|---|---|
| CN | 102717578 A | 10/2012 |
| CN | 202973713 U | 6/2013 |
| CN | 104816478 A | 8/2015 |
| CN | 105115221 | 12/2015 |
| CN | 2014963379 U | 1/2016 |
| DE | 4110292 A1 | 10/1992 |
| DE | 4311510 | 10/1994 |
| DE | 4409091 | 9/1995 |
| DE | 69401889 | 9/1997 |
| DE | 19914105 | 9/2000 |
| DE | 102010040346 | 3/2012 |
| DE | 102011051178 A1 | 12/2012 |
| EP | 0260699 | 3/1988 |
| EP | 0645576 A1 | 3/1995 |
| EP | 1602425 A1 | 12/2005 |
| EP | 1624263 A2 | 8/2006 |
| EP | 2543942 A2 | 1/2013 |
| EP | 2878427 A1 | 6/2015 |
| FR | 2991698 A1 | 12/2013 |
| JP | 404165197 | 6/1992 |
| JP | 04165197 | 10/1992 |
| JP | 04309778 A | 11/1992 |
| JP | H071479 | 1/1995 |
| JP | 11159693 A | 6/1999 |

(56) References Cited

FOREIGN PATENT DOCUMENTS

| | | |
|---|---|---|
| JP | 2000320958 A | 11/2000 |
| JP | 2002068853 | 3/2002 |
| JP | 3438948 | 8/2003 |
| JP | 2005069596 A | 3/2005 |
| JP | 2005098637 A | 4/2005 |
| JP | 2006161834 A | 6/2006 |
| JP | 2006200685 A | 8/2006 |
| JP | 2007085696 | 4/2007 |
| JP | 2008190815 | 8/2008 |
| JP | 2013050267 A | 3/2013 |
| JP | 2013076471 A | 4/2013 |
| KR | 20050095357 A | 9/2005 |
| KR | 100620025 B1 | 9/2006 |
| KR | 1020070065743 A | 6/2007 |
| KR | 20090026045 | 3/2009 |
| KR | 20150089495 A | 8/2015 |
| RU | 547614 | 5/1977 |
| RU | 2061925 C1 | 6/1996 |
| RU | 2077411 C1 | 4/1997 |
| RU | 2081858 | 6/1997 |
| RU | 2132522 C2 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 648780 A1 | 2/1979 |
| SU | 01307186 A1 | 4/1987 |
| WO | 9614207 A1 | 5/1996 |
| WO | 9721767 | 6/1997 |
| WO | 9920961 A1 | 4/1999 |
| WO | 9920964 | 4/1999 |
| WO | 03072684 A1 | 9/2000 |
| WO | 200160598 | 8/2001 |
| WO | 200202987 | 1/2002 |
| WO | 2002052208 | 4/2002 |
| WO | 02060576 A1 | 8/2002 |
| WO | 2004010042 A1 | 1/2004 |
| WO | 2006045694 | 5/2006 |
| WO | 2006073540 A2 | 7/2006 |
| WO | 2007033836 A1 | 3/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2010007783 A1 | 1/2010 |
| WO | 2010127947 A2 | 11/2010 |
| WO | 2011058678 A1 | 5/2011 |
| WO | 2012152646 | 11/2012 |
| WO | 2013116103 | 8/2013 |
| WO | 2013116302 | 8/2013 |
| WO | 2014038150 A1 | 3/2014 |
| WO | 2014121893 A1 | 8/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

Raszewski et al., "Methods for Producing Hollow Glass Microspheres," Powerpoint, cached from Google, Jul. 2009, 6 pages.

METHODS FOR DISPENSING AND COMPACTING INSULATION MATERIALS INTO A VACUUM SEALED STRUCTURE

CROSS-REFERENCE TO RELATED APPLICATION

The present application is a continuation of U.S. patent application Ser. No. 14/961,952 filed Dec. 8, 2015, entitled METHODS FOR DISPENSING AND COMPACTING INSULATION MATERIALS INTO A VACUUM SEALED STRUCTURE, the entire disclosure of which is hereby incorporated herein by reference.

BACKGROUND

This device is in the field of insulating materials for appliances. More specifically, this device relates to various methods for dispensing and compacting insulation material to form a vacuum sealed structure.

SUMMARY

In at least one aspect, a method of forming an insulated structure for an appliance includes forming a structural enclosure having an outer wrapper and an inner liner and an insulating cavity defined therebetween. An insulating powder material is formed and the insulating powder material is compacted to form a pre-densified core material. The pre-densified core material is disposed within an insulating cavity, wherein the insulating cavity is defined between the outer wrapper and the inner liner. At least a portion of the gas contained within the insulating cavity is expressed, wherein the insulating cavity is hermetically sealed to define a vacuum insulated structure.

In at least another aspect, a method of forming an insulated structure for an appliance includes providing a base formation, wherein a surface of the base formation defines a shape of an insulating enclosure. A first planar sheet is formed to the surface of the base formation, wherein the first planar sheet includes one of an outer wrapper and an inner liner of an insulating structure. An insulating powder material is compacted to define a pre-densified core material. The pre-densified core material is positioned in engagement with the first planar sheet. A second planar sheet is formed proximate the pre-densified core material, wherein the second planar sheet includes the other of the outer wrapper and the inner liner. The outer wrapper and inner liner are sealed together to define an insulating cavity between the outer wrapper and the inner liner, wherein the pre-densified core material is disposed within the insulating cavity. At least a portion of the gas contained within the insulating cavity is expressed wherein the insulating cavity is hermetically sealed to define a vacuum insulated structure.

In at least another aspect, a method of forming an insulated structure for an appliance includes providing a base formation, wherein a surface of the base formation defines a shape of an insulating enclosure. A first planar sheet is formed to the surface of the base formation, wherein the first planar sheet includes an inner liner of an insulating structure. An insulating powder material is compacted to define a pre-densified core material and the pre-densified core material is positioned in engagement with an outward facing surface of the inner liner. A second planar sheet is formed to the shape of the pre-densified core material, wherein the second planar sheet defines the outer wrapper. The outer wrapper and inner liner are sealed together to define an insulating cavity between the outer wrapper and the inner liner, wherein the pre-densified core material is disposed within the insulating cavity to define the insulating structure. The insulating structure is then removed from the base formation.

These and other features, advantages, and objects of the present device will be further understood and appreciated by those skilled in the art upon studying the following specification, claims, and appended drawings.

DETAILED DESCRIPTION OF EMBODIMENTS

Figure 1:
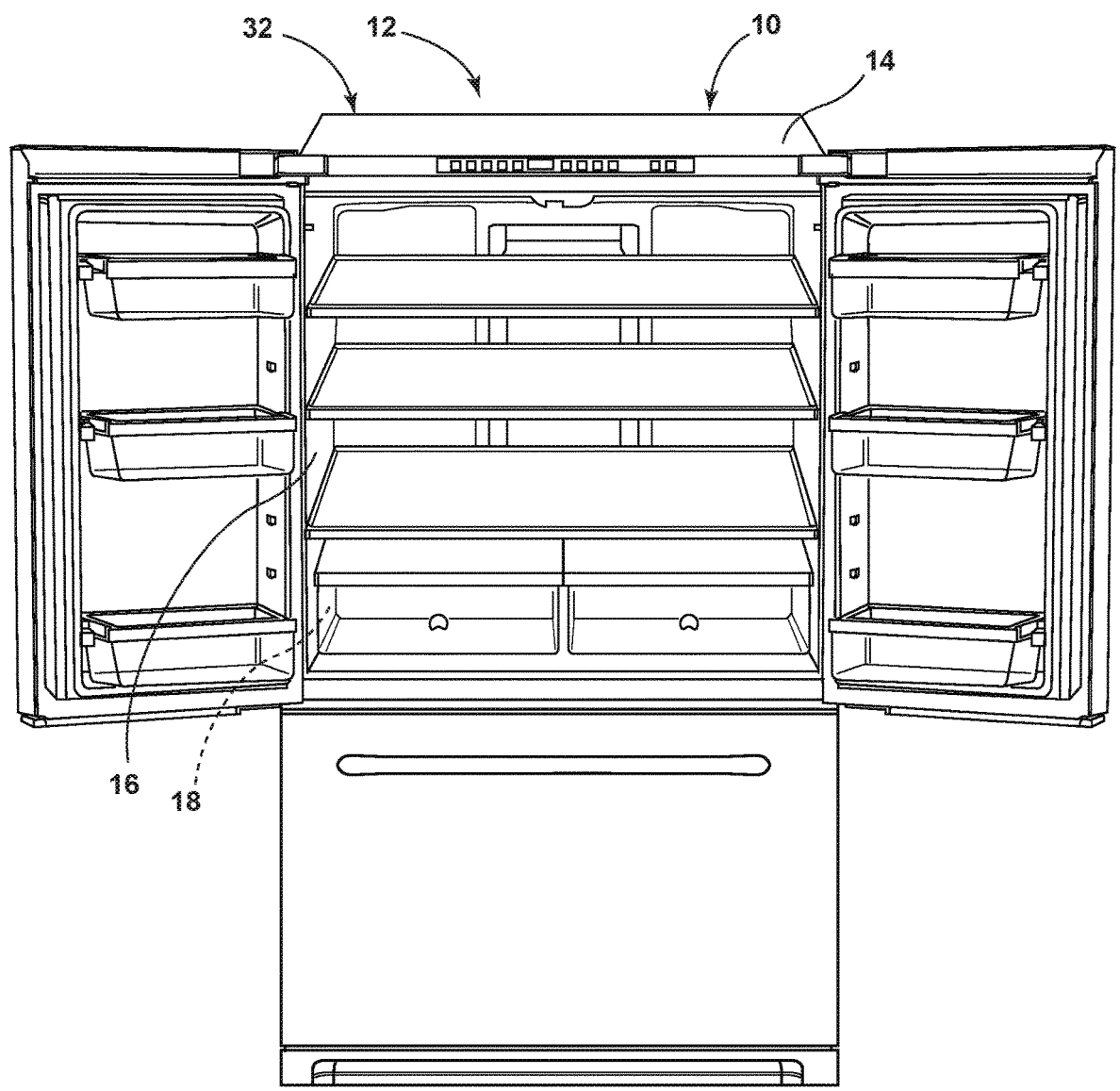
FIG. 1 is a front perspective view of an appliance incorporating an aspect of the vacuum insulated structure formed according to at least one aspect of the method described herein.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-6, reference numeral 10 generally refers to an insulating structure that is incorporated within an appliance 12 for providing an insulating functionality to various portions and compartments of the appliance 12. According to the various embodiments, the insulating structure 10 can typically include an outer wrapper 14 and an inner liner 16 that are sealed together and define an insulating cavity 18 between the outer wrapper 14 and the inner liner 16. An insulating material 20 is disposed within the insulating cavity 18, where the insulating material 20 can take any one of various forms. Such forms can be in a powder-type form of a core powder insulation 22, a granulated form of the core powder insulation 22, a pre-densified form of the core powder insulation 22, a densified three-dimensional insulating member 24 made of a core powder insulation 22, combinations thereof, and other similar compacted forms of the core powder insulation 22.

Figure 2:
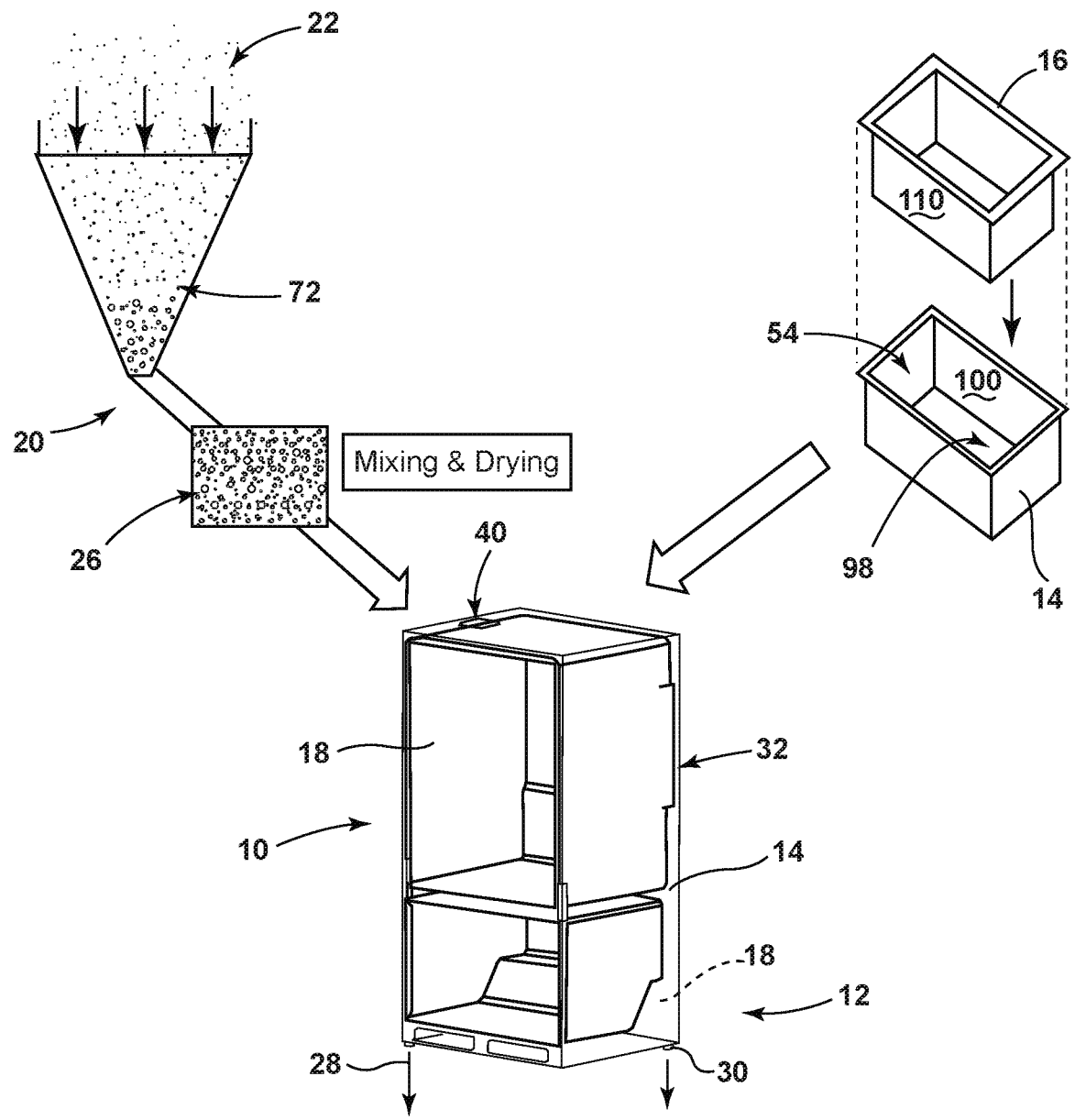
FIG. 2 is a schematic diagram illustrating a first process for forming the vacuum insulated structure.
Figure 3:
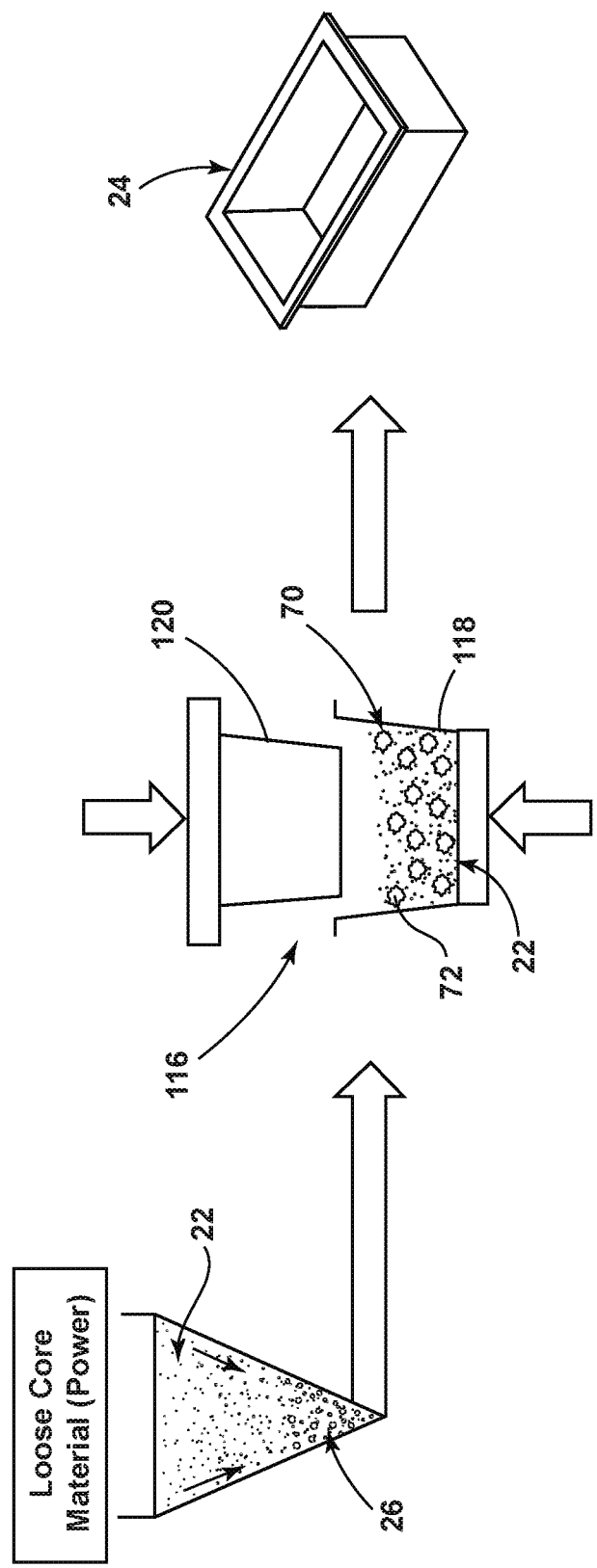
FIG. 3 is a schematic diagram illustrating a method for forming a three-dimensional insulating structure using an aspect of the core insulating powder.
Figure 4:
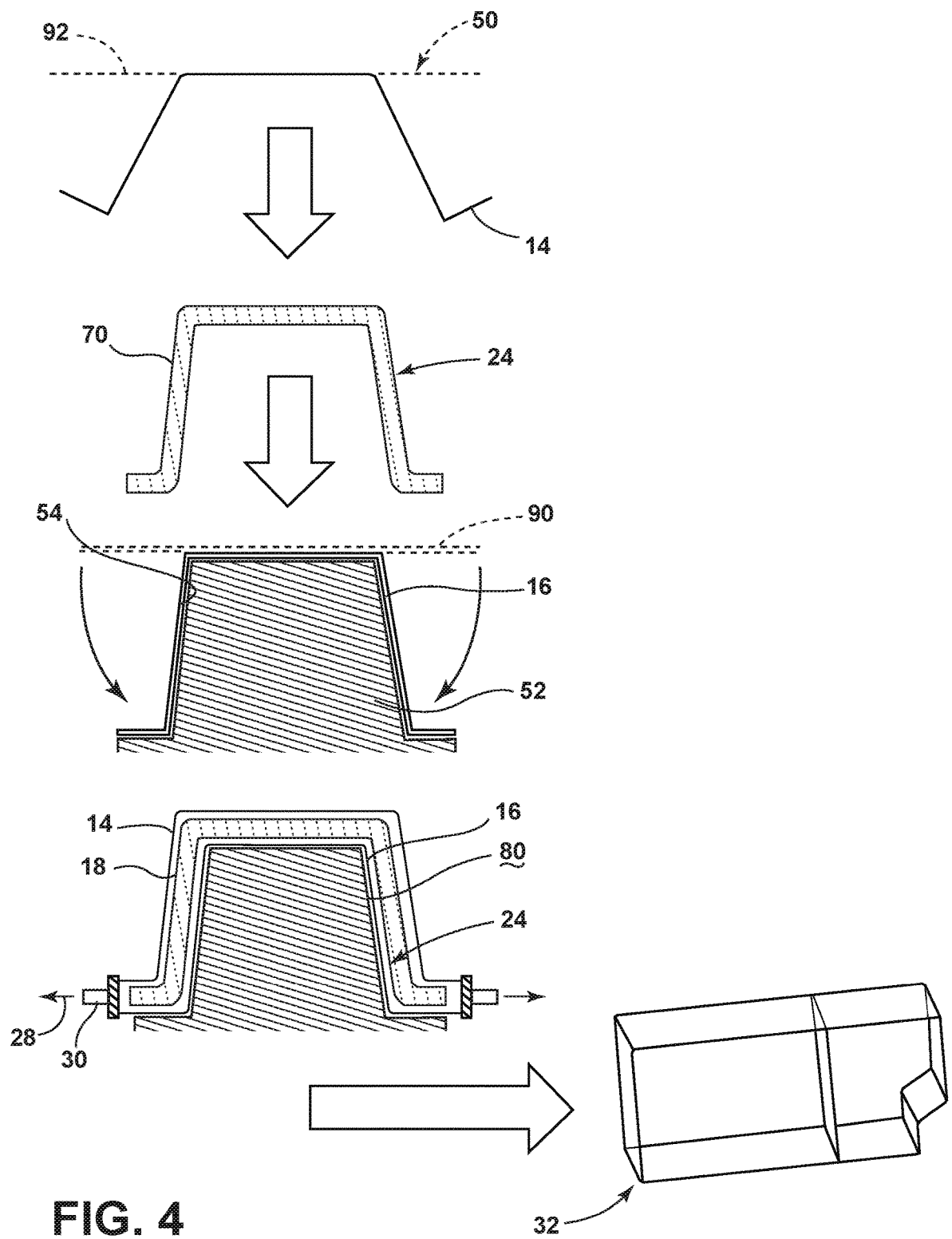
FIG. 4 is a schematic diagram illustrating an aspect of a process for forming a three-dimensional insulated structure using the core powder insulation.
Figure 5:
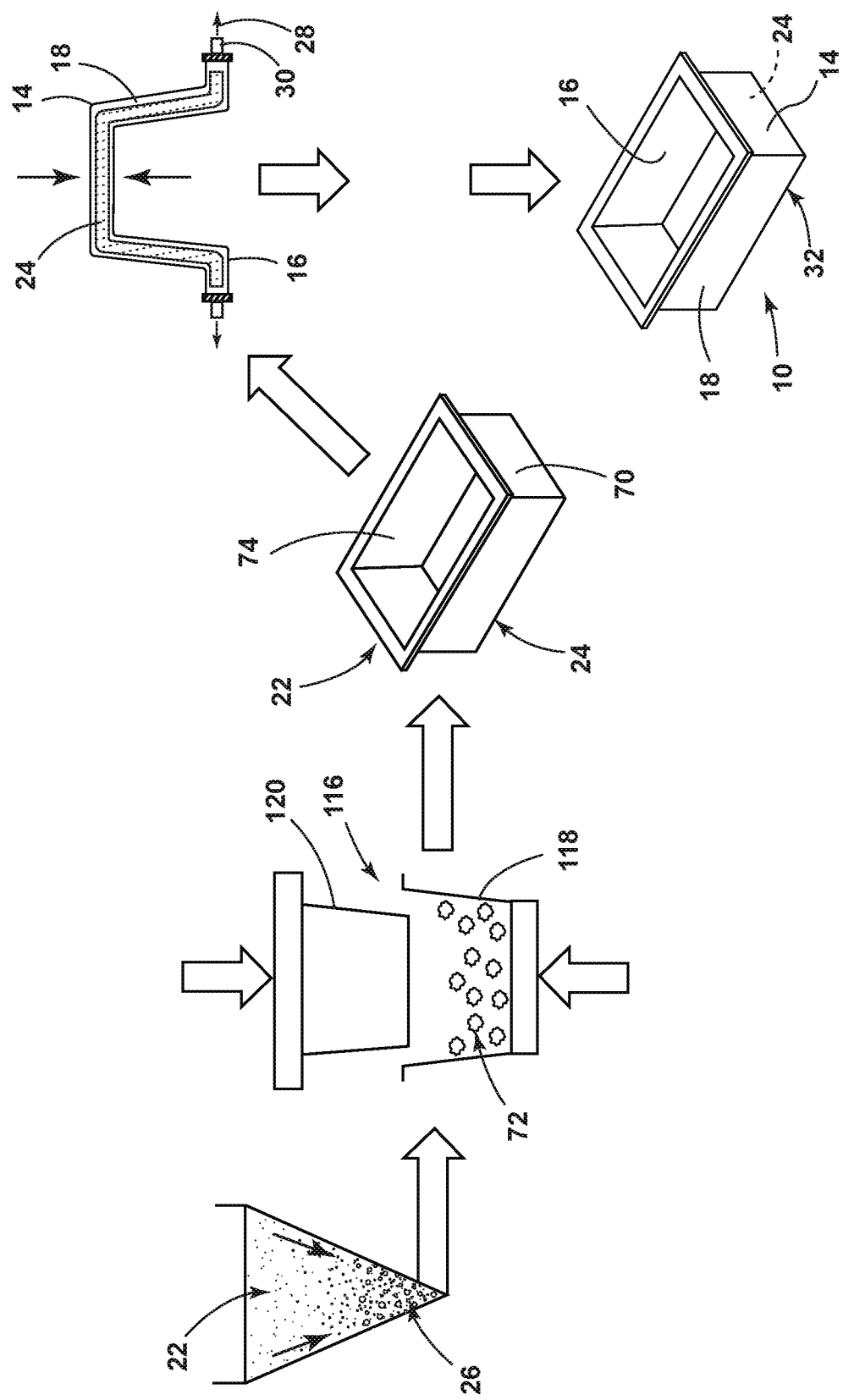
FIG. 5 is a schematic diagram illustrating a process for forming the vacuum insulated structure utilizing a three-dimensional core insulation member.
Figure 6:
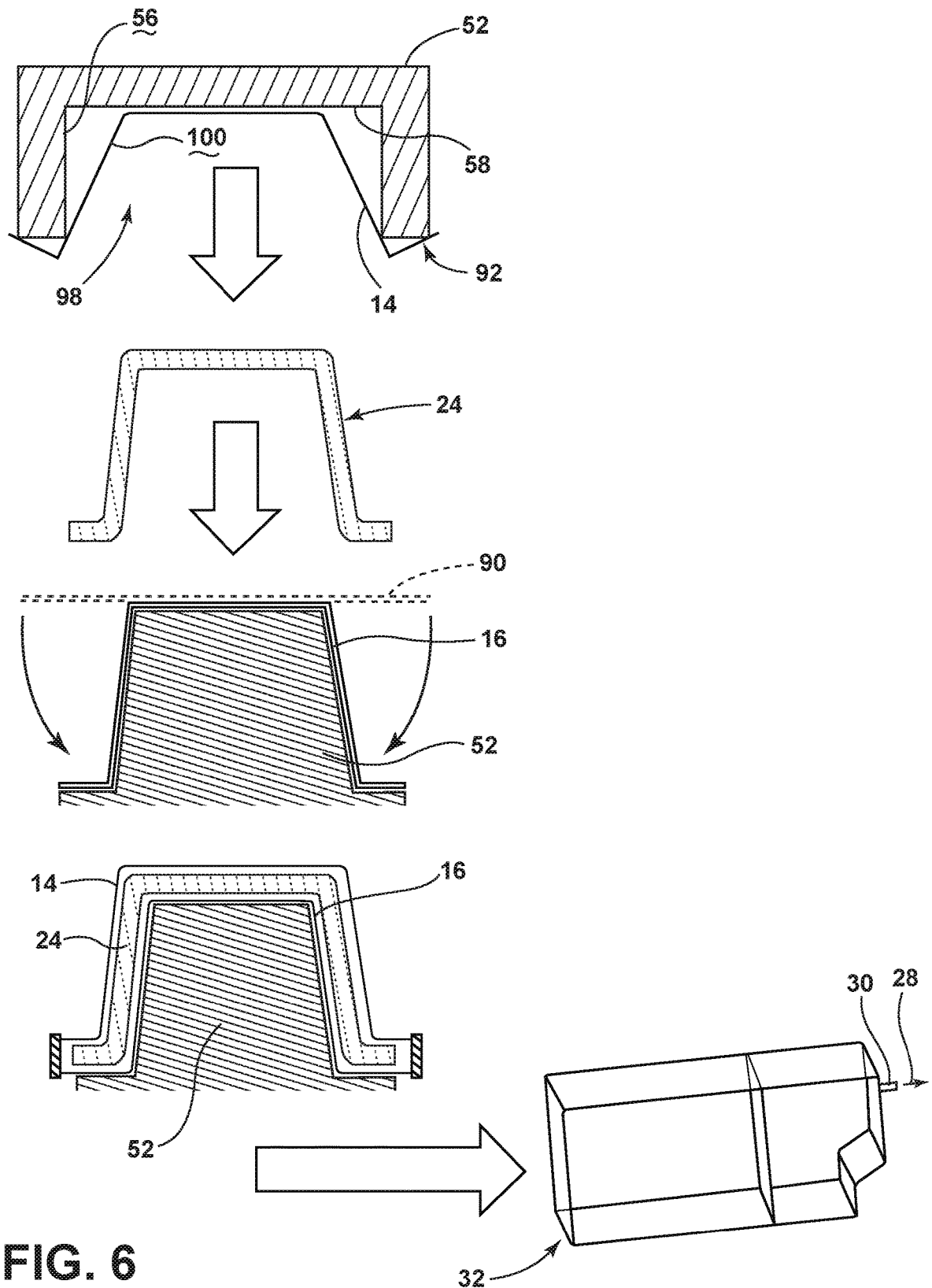
FIG. 6 is a schematic diagram illustrating an aspect of a method for forming a vacuum insulated structure utilizing a three-dimensional insulating core member.
Figure 7:
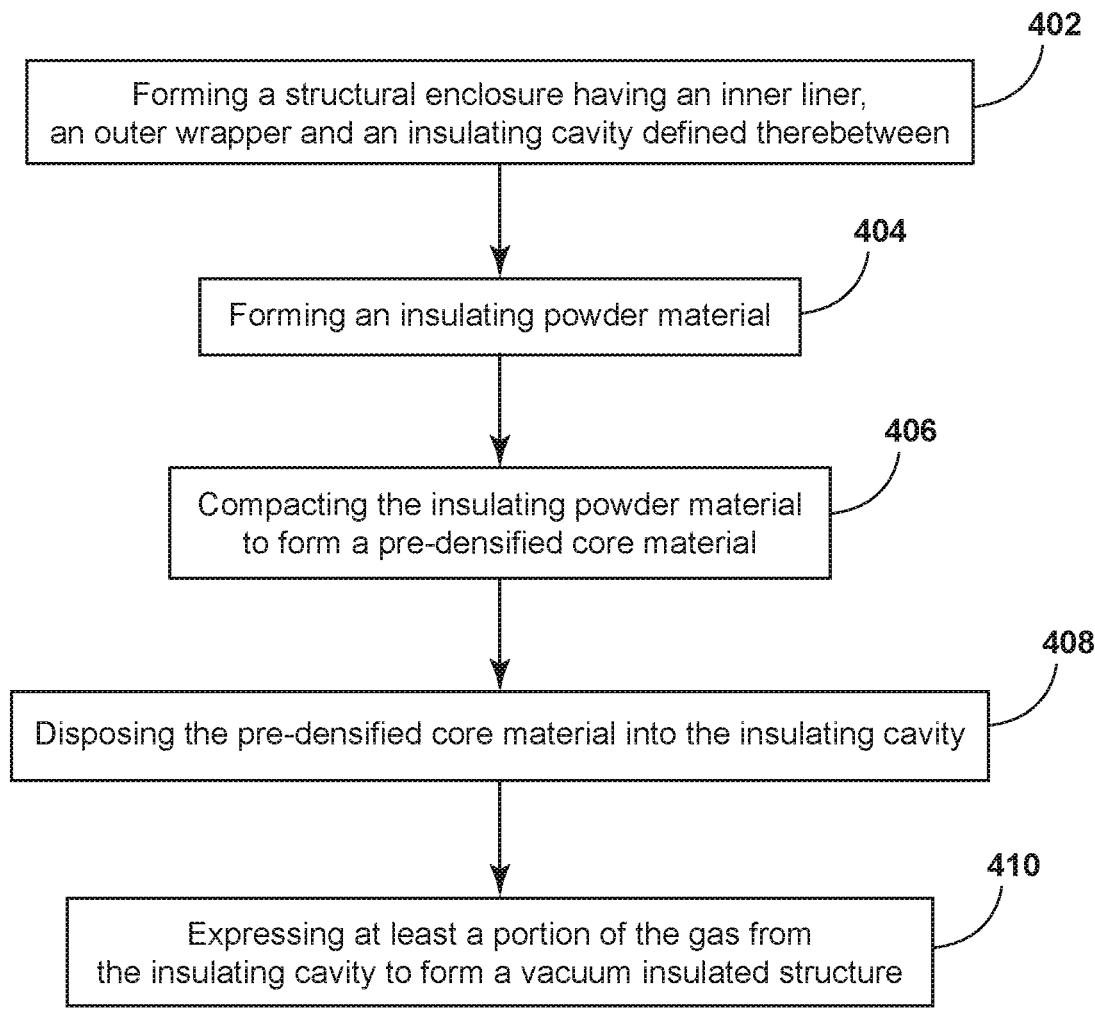
FIG. 7 is a schematic flow diagram illustrating a method for forming an insulated structure for an appliance.
Figure 8:
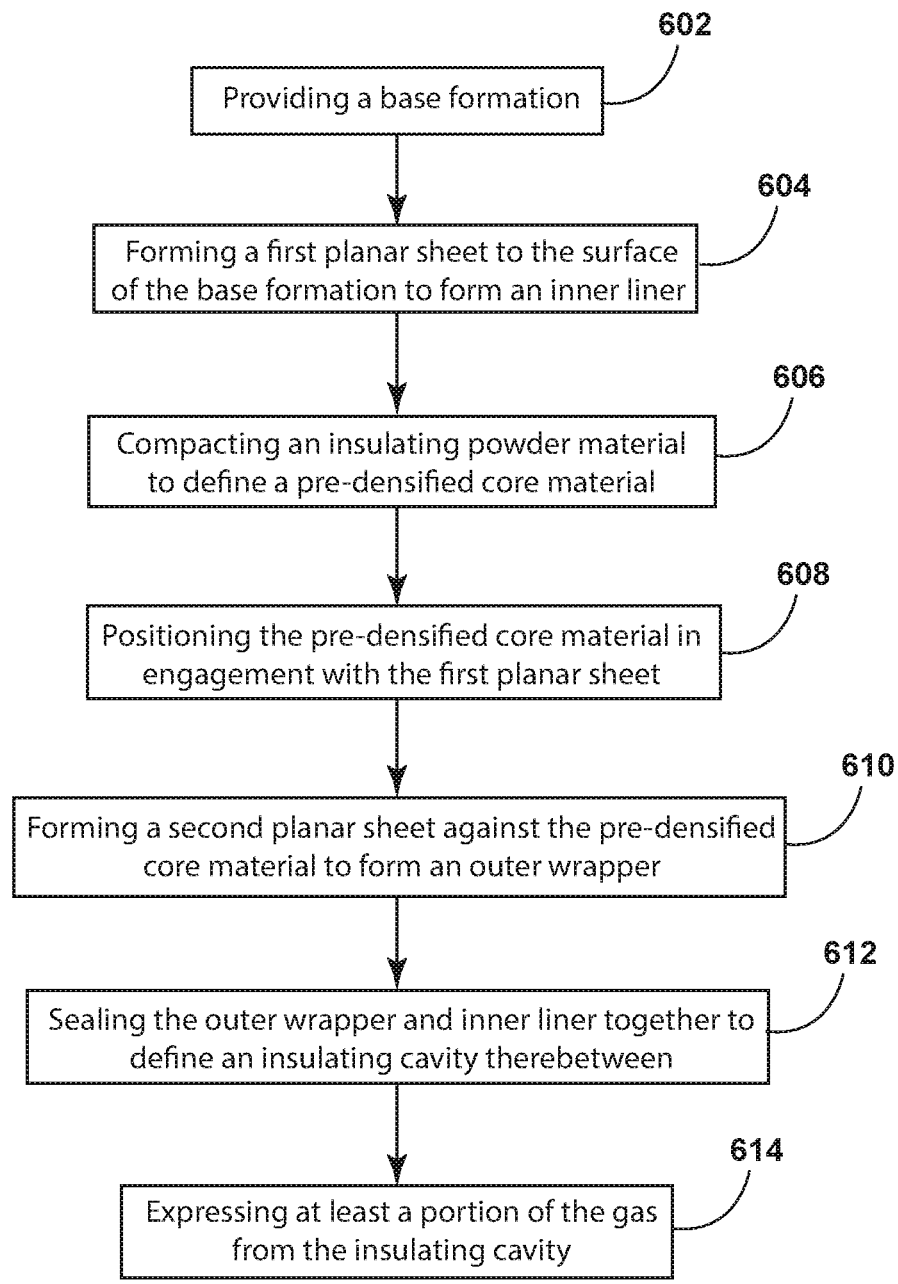
FIG. 8 is a schematic flow diagram illustrating an aspect of a method for forming an insulated structure for an appliance.
Figure 9:
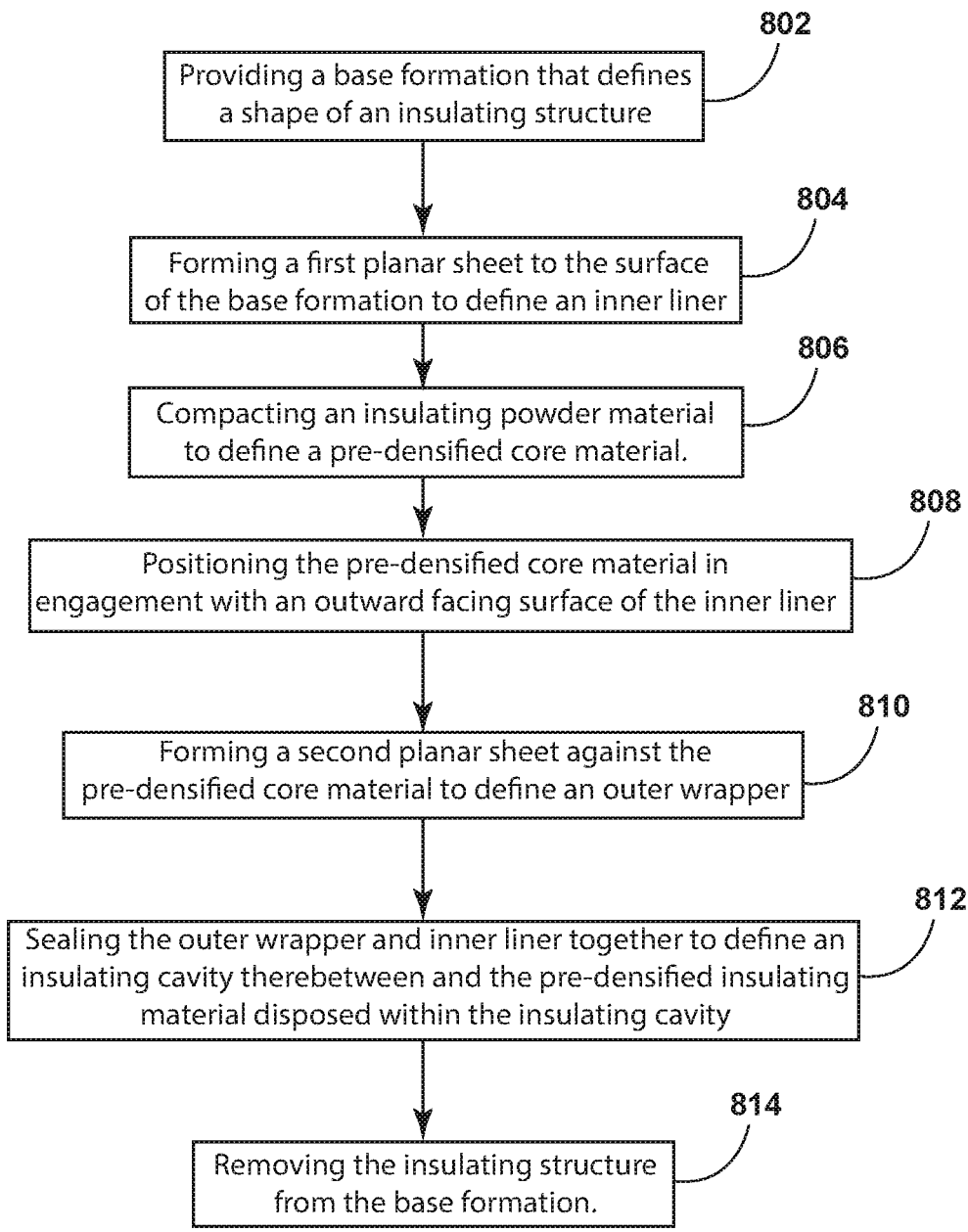
FIG. 9 is a schematic flow diagram illustrating an aspect of a method for forming an insulated structure for an appliance.

Referring now to FIGS. 2 and 7, a method 400 for forming an insulating structure 10 for an appliance 12 is disclosed. According to the method 400, a structural enclosure, such as an insulating structure 10 that includes the outer wrapper 14 and inner liner 16 is formed (step 402). As discussed above, the insulating cavity 18 can be defined between the outer wrapper 14 and the inner liner 16. The core powder material, which can take the form of an insulating powder material 20, is formed (step 404). It is contemplated that the insulating powder material 20 can be made of various nano/micro-sized particulate material that can include, but is not limited to, powdered silica (fume or precipitated), granulated silica, other silica material, powder aerogel, hollow glass spheres, perlite, rice husk ash, fly ash, silica fume, diatomaceous earth, carbon black and silicon carbide, combinations thereof, and other nano-sized and/or micro-sized particulate material. According to various embodiments, the insulating powder material 20 is compacted to form a pre-densified core material 26 (step 406). It is contemplated that the pre-densified core material 26 can take the form of a granulated aspect of the insulating powder material 20. The pre-densified core material 26 can then be further prepared for deposition into an insulating structure 10. Such further preparation can include mixing the pre-densified core material 26 with other additives and insulating materials 20 and also drying the pre-densified core material 26 to insure that substantially all of the fluid is evaporated or otherwise removed from the pre-densified core material 26. Such additives can include, but are not limited to, hollow glass spheres, glass fibers, perlite, rice husk ash, fly ash, silica fume, diatomaceous earth, carbon black and silicon carbide, combinations thereof and other similar insulating additives.

Referring again to FIGS. 2 and 7, once the pre-densified core material 26 is prepared, the pre-densified core material 26 is disposed within the insulating cavity 18 of the insulating structure 10 (step 408). Once disposed therein, the insulating structure 10 can be hermetically sealed and at least a portion of the gas 28 contained within the insulating cavity 18 can be expressed through at least one vacuum port 30 (step 410). In this manner, the hermetically sealed insulating structure 10 forms a vacuum insulated structure 32.

Referring now to FIGS. 2-6, it is contemplated that the pre-densified core material 26 can be positioned within the insulating cavity 18 and between the inner liner 16 and outer wrapper 14 before the outer wrapper 14 and inner liner 16 are attached and/or sealed together. In such an embodiment, it is contemplated that the pre-densified core material 26 can be disposed within the outer wrapper 14 and the inner liner 16 can be placed thereon. The final compaction of the pre-densified core material 26 in this embodiment can occur as the inner liner 16 is placed within the outer wrapper 14, and the pre-densified core material 26 is compressed to substantially conform to the shape of the insulating cavity 18 defined between the outer wrapper 14 and the inner liner 16.

According to various alternate embodiments, it is contemplated that the pre-densified core material 26 can be disposed within the insulating cavity 18 through an inlet port 40 defined in one of the outer wrapper 14 and inner liner 16. In such an embodiment, it is contemplated that the pre-densified core material 26 is disposed within the insulating cavity 18 after the outer wrapper 14 and inner liner 16 are attached and, in certain embodiments, sealed together. It is also contemplated that a compaction of the pre-densified core material 26 into the finally compacted three-dimensional insulating member 24 of the vacuum insulating structure 10 can occur during expression of gas 28 from the insulated cavity. In such an embodiment, the expression of gas 28 from the insulating cavity 18 can result in a negative compressive force being exerted upon the pre-densified core material 26 to further compress the pre-densified core material 26 into a finally compacted three-dimensional insulating member 24 disposed within the insulating cavity 18. Where the pre-densified core material 26 is disposed in the insulating cavity 18 via the inlet port 40, the compaction of the pre-densified core material 26 can be assisted through various vibrating and/or rotating mechanisms that serve to position the particles of the pre-densified core material 26 in a more densified state and throughout the insulating cavity 18. The vibrating and rotating mechanisms adjust the positioning of the pre-densified core material 26 such that the insulating structure 12 is shaken and rotated to manipulate the pre-densified core material 26 to occupy the entire insulating cavity 18.

Referring now to FIGS. 3-6, according to various embodiments, it is contemplated that the step of forming the structural enclosure can include wrapping a planar sheet 50 around a base formation 52. In such an embodiment, the wrapped planar sheet 50 can take the form of the inner liner 16 such that the base formation 52 defines at least one compartment of the appliance 12 defined by the inward facing surface 56 of the inner liner 16. It is also contemplated that a base formation 52 can include a forming cavity 58 within which the planar sheet 50 is disposed. In these embodiments, the planar sheet 50 is formed within the forming cavity 58 to form the outer wrapper 14. It is contemplated that where the base formation 52 is used, the insulating structure 10 can remain upon the base formation 52 at least until the pre-densified core material 26 is disposed within the insulating cavity 18 of the insulating structure 10 and the inner liner 16 and outer wrapper 14 are sealed together.

Referring again to FIGS. 3 and 4, it is contemplated that the pre-densified core material 26 can take the form of a three-dimensional insulating member 24 that can be disposed as a single piece between the inner liner 16 and outer wrapper 14 of the insulating structure 10. It is contemplated that in order to keep the three-dimensional shape of the three-dimensional insulating member 24, the three-dimensional insulating member 24 can include at least one binder material 70. Such binder materials 70 can include, but are not limited to, various cellulose compounds, wax, polyethylene glycol, gelatin, starch, polyvinyl alcohol, polymethacrylates, sodium silicates, combinations thereof, and other similar organic and inorganic materials that can be included within the pre-densified core material 26 to form and maintain the shape of the three-dimensional insulating member 24. It is contemplated that the three-dimensional insulating member 24 can be formed through a compaction of the pre-densified core material 26, or through compaction of the insulating powder material 20. It is further contemplated that the three-dimensional insulating member 24 can be made by compacting both the pre-densified core material 26 and also the insulating powder material 20 that have been mixed together to form a substantially uniform insulating material 20. It is contemplated that the use of both a pre-densified granular insulating material 72 and the insulating powder material 20 to be compacted to form the three-dimensional insulating member 24 can serve to allow the particles of the insulating powder material 20 to fit between the porous spaces defined between the larger particles of the granular insulating material 72. In this manner, compaction of the insulating mixture made up of the insulating powder material 20 and the pre-densified granular insulating material 72 can be a densified three-dimensional insulating member 24 having a substantially consistent and uniform distribution of particles of the insulating powder material 20 and the granular insulating material 72.

Referring again to FIGS. 3, 4 and 6, it is contemplated that after the three-dimensional insulating member 24 or core member is formed, the three-dimensional insulating member 24 can be bonded to one or both of the outer wrapper 14 and the inner liner 16. This bonding step can serve to minimize the amount of air spaces that may exist between the three-dimensional core member and the outer wrapper 14 and the inner liner 16. The bonding step can be performed by welding, adhesives, bonding agents, combinations thereof and other similar methods and materials.

Referring again to FIGS. 1-6 and 8, a method 600 is disclosed for forming an insulated structure for an appliance 12. According to various aspects of the method 600, a base formation 52 is provided where a surface 80 of the base formation 52 defines a shape of the insulating structure 10 or insulating enclosure (step 602). As discussed above, the base formation 52 can be in the form of a positive volume around which a planar sheet 50 is formed to define the inner liner 16. As also discussed above, the base formation 52 can take the form of a forming cavity 58 within which a planar sheet 50 can be formed to define the outer wrapper 14. According to the method 600, a first planar sheet 90 can be formed to the surface 80 of the base formation 52 (step 604). It is contemplated that the first planar sheet 90 can be formed to define either the outer wrapper 14 or the inner liner 16 of the insulating structure 10. As discussed above, the insulating powder material 20 can be compacted to define a pre-densified core material 26 (step 606). The pre-densified core material 26 can take the form of a granular insulating material 72 where various portions of the insulating powder material 20 are compacted into larger granular sized pieces of insulating material 20. The sizes of the particles of the pre-densified core material 26 and the granular sizes of the insulating material 20 can vary. By way of example, and not limitation, such particle and/or granule sizes can range from approximately 250 microns to approximately 5000 microns. It is contemplated that smaller particle sizes and larger granule sizes can be implemented. In order to maintain the size and shape of the granular insulating material 72, the particles of the granular insulating material 72 can be combined with the binder material 70 that provides each granule of the granular insulating material 72 with greater compressive strength than various granules without the binder material 70. It is also contemplated that the pre-densified core material 26 can take the form of a three-dimensional insulating member 24, where the three-dimensional insulating member 24 can include one or more of the binder materials 70 to maintain the shape of the three-dimensional insulating member 24. In this manner, the binder materials 70 allow the three-dimensional insulating member 24 to be handled more easily without substantially disintegrating, degrading, or otherwise becoming damaged. It is further contemplated that the three-dimensional insulating member 24 can be wrapped in a high barrier metallized film 74 having one or more layers or other membrane to allow the three-dimensional insulating member 24 to be handled without substantial damage.

Referring again to FIGS. 3-6 and 8, the pre-densified core material 26 can be positioned in engagement with the formed first planar sheet 90 (step 608). As discussed above, where the pre-densified core material 26 is a granular insulating material 72, the granular insulating material 72 can be poured into the outer wrapper 14 and the inner liner 16 placed on top. The inner liner 16 and outer wrapper 14 can be pressed together such that the granular insulating material 72 is compacted further to form the three-dimensional insulating member 24 by pressing the inner liner 16 into the outer wrapper 14, thereby compressing the pre-densified core material 26. Alternatively, where the pre-densified core material 26 is a three-dimensional insulating member 24, it is contemplated that the three-dimensional insulating member 24 can be either placed over the inner liner 16, or placed within the outer wrapper 14. Once the pre-densified core material 26 is placed within engagement of the first planar sheet 90, a second planar sheet 92 is formed substantially to the shape of the three-dimensional insulating member 24 and placed against the pre-densified core material 26. It is contemplated that the second planar sheet 92 can include the other of the outer wrapper 14 and inner liner 16 that engages the first planar sheet 90 formed on the surface 80 of the base formation 52 (step 610). The outer wrapper 14 and inner liner 16 can then be sealed together to define an insulating cavity 18 between the outer wrapper 14 and the inner liner 16 (step 612). It is contemplated that the pre-densified core material 26 is disposed within the insulating cavity 18 between the inner liner 16 and the outer wrapper 14. At least a portion of the gas 28 contained within the insulating cavity 18 can be expressed from the insulating cavity 18 (step 614). It is contemplated that the insulating cavity 18 can then be hermetically sealed to define the vacuum insulated structure 32 with the compacted and pre-densified core material 26 disposed therein.

Referring again to FIGS. 3-6, where the first planar sheet 90 defines the outer wrapper 14, the pre-densified core material 26 can be disposed within a wrapper volume 98 defined by an interior surface 100 of the outer wrapper 14. As discussed above, in such an embodiment, the pre-densified core material 26 can take the form of the granular insulating material 72 for the three-dimensional insulating member 24. Once disposed within the wrapper volume 98, the inner liner 16 can be placed over the outer wrapper 14 such that the granular insulating material 72 can be compacted, or such that the three-dimensional insulating member 24 can be disposed in the insulating cavity 18 between the inner liner 16 and the outer wrapper 14.

Referring again to FIGS. 5 and 6, where the first planar sheet 90 is the inner liner 16, the pre-densified core material 26, typically in the form of a three-dimensional insulating member 24, is disposed against an outward facing surface 110 of the inner liner 16. In this manner, the three-dimensional insulating member 24 surrounds the outward facing surface 110 of the inner liner 16 such that the outer wrapper 14 can be placed over the three-dimensional insulating member 24 and sealed with the inner liner 16 to form the insulating cavity 18 and, in turn, the insulating structure 10. It is contemplated that in such an embodiment, the three-dimensional core member can be bonded to at least the outward facing surface 110 of the inner liner 16. The three-dimensional insulating member 24 can also be bonded to the outer wrapper 14 proximate the insulating cavity 18.

According to the various embodiments of the methods described herein, the insulating powder material 20 is disposed into direct engagement with the inner liner 16 and the outer wrapper 14. This is the case whether the insulating powder material 20 is in powder form, granular form, or in the form of the three-dimensional insulating member 24. In this manner, the vacuum insulated structure 32 can be formed without the use of barrier films or porous bags that may separate the insulating material 20 from the inner liner 16 and/or the outer wrapper 14.

Referring again to FIGS. 2-6 and 9, a method 800 is disclosed for forming an insulated structure for an appliance 12. According to the method 800, a base formation 52 is provided, where a surface 80 of the base formation 52 defines a shape of an insulating structure 10 or insulating enclosure (step 802). According to the method 800, a first planar sheet 90 is formed at the surface 80 of the base formation 52, where the first planar sheet 90 defines the inner liner 16 of the insulating structure 10 (step 804). The insulating powder is then compacted to define the pre-densified core material 26 (step 806). As discussed above, the pre-densified core material 26 can be compacted in the form of a three-dimensional insulating member 24 or in the form of a granular insulating material 72. The three-dimensional insulating member 24 can be in the form of a contoured shape that conforms to the shape of a portion of the inner liner 16 and/or the outer wrapper 14. The three-dimensional insulating member 24 can also be in the form of an insulating panel that is generally rectilinear and/or cuboidal in configuration. According to the method 800, the pre-densified core material 26 is then positioned in engagement with an outward facing surface 110 of the inner liner 16 (step 808). In such an embodiment, the pre-densified core material 26 will, typically, take the form of a three-dimensional insulating member 24. In this manner, the three-dimensional insulating member 24 can be placed over the outward facing surface 110 of the inner liner 16 and the three-dimensional insulating member 24 can maintain its shape, or substantially maintain its shape, during formation of the insulating structure 10. A second planar sheet 92 is then formed to define the outer wrapper 14.

According to various embodiments, the outer wrapper 14 can be formed against a separate base formation 52, or can be formed around a portion of the pre-densified core material 26 (step 810). It is contemplated that the inner liner 16 and outer wrapper 14 can take the form of a metal panel that is shaped, pressed, punched, or otherwise manipulated to take the form of the inner liner 16 and/or the outer wrapper 14. It is further contemplated that the inner liner 16 and outer wrapper 14 can be made of a polymer-type material. In such an embodiment, the polymer-type material can be blow molded, vacuum formed, thermoformed, injection-molded, compression molded, or otherwise shaped to form the inner liner 16 and/or the outer wrapper 14. Where a plastic-type material is used, the outer wrapper 14 and the inner liner 16 can include various barrier layers or films that can vary depending on the design of the insulating structure 10 and the insulating requirements thereof.

According to the method 800, as exemplified in FIGS. 2-6 and 9, after the outer wrapper 14 is placed over the pre-densified core material 26 and the inner liner 16, the outer wrapper 14 and inner liner 16 are sealed together to define the insulating cavity 18 (step 812). In this manner, the pre-densified core material 26 is contained within the insulating cavity 18 to define the insulating structure 10 for the appliance 12. After the insulating structure 10 is formed, it is contemplated that the insulating structure 10 can be removed from the base formation 52 (step 814). It is also contemplated that the insulating structure 10 can be removed from the base formation 52 after gas 28 is expressed from the insulating cavity 18 and the vacuum insulated structure 32 is formed. As such, the expressing step can be performed while the insulating structure 10 is engaged with the base formation 52 and removed after the vacuum insulating structure 10 is formed.

According to the various embodiments, aspects of the step 806 of compacting the insulating powder material 20 and/or the granular insulating material 72 into the three-dimensional insulating member 24 or 2D VIP or 2D core panels can be performed either between the inner liner 16 and outer wrapper 14, or can be performed in a separate pressing assembly 116 where the insulating material 20 is disposed within a compression cavity 118 and a compression member 120 is disposed within the compression cavity 118 to compress the insulating material 20 into the three-dimensional insulating member 24. It is contemplated that the binder material 70 can be disposed within the compression cavity 118 and mixed in with the insulating material 20 such that when the three-dimensional insulating member 24 is formed, the binder material 70 substantially retains the three-dimensional insulating member 24 in its shape for removal from the compression cavity 118 and placement on either the inner liner 16 or within the outer wrapper 14 to form the insulating structure 10.

It is contemplated that the various aspects of the devices and methods described herein can be utilized to form various insulating forms that include, but are not limited to, three-dimensional insulating members 24, insulating panels, planar core members, plural and contoured three-dimensional vacuum insulated panels, and others. It is also contemplated that the insulating member or members formed using the aspects of the device can be used within various appliances 10. Such appliances 10 can include, but are not limited to, refrigerators, freezers, warmers, ovens, dishwashers, laundry appliances, water heaters, furnaces, and other similar appliances.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method of forming an insulated structure for an appliance, the method comprising steps of:
    compacting a silica-based insulating powder material to form a pre-densified core material;
    positioning the pre-densified core material between inner and outer panels, wherein an insulating cavity is defined between the inner and outer panels; and
    sealing the inner and outer panels to contain the pre-densified core material within the insulating cavity to define the insulated structure.

2. The method of claim 1, wherein the pre-densified core material is a silica-based granular insulating material, and wherein the silica-based insulating powder material includes at least one of fumed silica and precipitated silica.

3. The method of claim 1, wherein the inner and outer panels define an inner liner and an outer wrapper, respectively, and the pre-densified core material is positioned between the inner liner and the outer wrapper before the outer wrapper and the inner liner are attached together.

4. The method of claim 3, wherein the pre-densified core material is a three-dimensional core member.

5. The method of claim 4, wherein the three-dimensional core member is bonded to at least one of the outer wrapper and the inner liner.

6. The method of claim 1, wherein the pre-densified core material is a three-dimensional core member that includes at least one binder material, wherein the binder material includes at least one of cellulose, wax, polyethylene glycol, gelatin, starch, polyvinyl alcohol, polymethacrylate and sodium silicate.

7. The method of claim 1, wherein the step of compacting the silica-based insulating powder material to form the pre-densified core material is at least partially performed between the inner and outer panels.

8. The method of claim 7, wherein at least a portion of the step of compacting the silica-based insulating powder material includes placing the silica-based insulating powder material against the outer panel and compressing the silica-based insulating powder material with the inner panel.

9. The method of claim 7, wherein the step of compacting the silica-based insulating powder material is performed while expressing at least a portion of gas from the insulating cavity, wherein the silica-based insulating powder material directly engages the inner and outer panels.

10. The method of claim 1, wherein the step of positioning the pre-densified core material includes wrapping an inner panel around a base formation, wherein the inner panel forms an inner liner, wherein the inner panel remains on the base formation at least until the pre-densified core material is disposed within the insulating cavity.

11. A method of forming an insulated structure for an appliance, the method comprising steps of:
    providing a base formation, wherein a surface of the base formation defines a shape of an insulating enclosure;
    forming a first planar sheet to the surface of the base formation;
    compacting a silica insulating powder material to define a pre-densified core material;
    positioning the pre-densified core material in engagement with the first planar sheet;
    forming a second planar sheet against the pre-densified core material; and
    sealing the first and second planar sheets together to define an insulating cavity between the first and second planar sheets, wherein the pre-densified core material is disposed within the insulating cavity.

12. The method of claim 11, further comprising a step of:
    expressing at least a portion of a gas contained within the insulating cavity, wherein the first and second planar sheets and the pre-densified core material at least partially define a vacuum insulated structure.

13. The method of claim 11, wherein the pre-densified core material is disposed within a wrapper volume defined by an interior surface of the first planar sheet.

14. The method of claim 11, wherein the pre-densified core material is in a form of a partially compacted granular insulating material.

15. The method of claim 11, wherein the step of compacting the silica insulating powder material to define the pre-densified core material is performed while the silica insulating powder material is within the insulating cavity, and wherein the pre-densified core material is in a form of a three-dimensional insulating member.

16. The method of claim 15, wherein the three-dimensional insulating member is bonded to an inward facing surface of the first planar sheet, wherein the inward facing surface at least partially defines the insulating cavity.

17. The method of claim 12, wherein the vacuum insulated structure is free of a barrier film disposed in the insulating cavity.

\* \* \* \* \*